US009936356B2

(12) United States Patent
Jeong et al.

(10) Patent No.: US 9,936,356 B2
(45) Date of Patent: Apr. 3, 2018

(54) LOCATION ESTIMATION METHOD FOR INDOOR DEVICE

(71) Applicant: RESEARCH & BUSINESS FOUNDATION OF SUNGKYUNKWAN UNIVERSITY, Suwon-si (KR)

(72) Inventors: Jaehoon Jeong, Suwon-si (KR); Tae Moon Kim, Seoul (KR); Sol Chan Yeon, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/373,111

(22) Filed: Dec. 8, 2016

(65) Prior Publication Data

US 2017/0171718 A1 Jun. 15, 2017

(30) Foreign Application Priority Data

Dec. 9, 2015 (KR) ........................ 10-2015-0174596

(51) Int. Cl.
*G01S 5/02* (2010.01)
*H04W 4/00* (2009.01)
*H04W 4/04* (2009.01)

(52) U.S. Cl.
CPC ............. *H04W 4/04* (2013.01); *G01S 5/0284* (2013.01); *G01S 5/0294* (2013.01); *H04W 4/008* (2013.01)

(58) Field of Classification Search
CPC ..... H04W 4/008; G01S 5/0294; G01S 5/0284
See application file for complete search history.

(56) References Cited

U.S. PATENT DOCUMENTS

| 9,244,152 | B1 * | 1/2016 | Thiagarajan | G01S 5/10 |
| 9,408,040 | B2 * | 8/2016 | Cooper | H04W 4/043 |
| 2009/0312037 | A1 * | 12/2009 | Jo | G01S 5/08 455/456.2 |

* cited by examiner

Primary Examiner — Asghar Bilgrami
(74) Attorney, Agent, or Firm — NSIP Law

(57) ABSTRACT

Estimating a location of a device indoor by measuring a location of a terminal based on a starting point using a sensor, receiving a signal from the device located in the room through short-range communication, storing a plurality of first locations in which the signal is received from the device and an intensity of the signal, determining a center point of a plurality of second locations in which the intensity of the signal is equal to or greater than a reference value at a corresponding location among the plurality of first locations or belonging to a higher reference range are selected in descending order of the intensity of the signal from the plurality of first locations, and determining an estimated location for the device using a probability distribution model.

17 Claims, 10 Drawing Sheets

| SAMPLE LOCATION | $p_1$ | ... | $p_{j-1}$ | $p_j$ | $p_{j+1}$ | ... | $p_n$ |
|---|---|---|---|---|---|---|---|
| SIGNAL INTENSITY | $w_1$ | ... | $w_{j-1}$ | $w_j$ | $w_{j+1}$ | ... | $w_n$ |
| DISTANCE | $l_1$ | ... | $l_{j-1}$ | $l_j$ | $l_{j+1}$ | ... | $l_n$ |
| DISTANCE MEAN VALUE | $\mu_1$ | ... | $\mu_{j-1}$ | $\mu_j$ | $\mu_{j+1}$ | ... | $\mu_n$ |
| DISTANCE STANDARD DEVIATION VALUE | $\sigma_1$ | ... | $\sigma_{j-1}$ | $\sigma_j$ | $\sigma_{j+1}$ | ... | $\sigma_n$ |

LOCATION ESTIMATION METHOD FOR INDOOR DEVICE

CROSS-REFERENCE TO RELATED APPLICATION

This application claims the benefit under 35 USC 119(a) of Korean Patent Application No. 10-2015-0174596 filed on Dec. 9, 2015, in the Korean Intellectual Property Office, the entire disclosure of which is incorporated herein by reference for all purposes.

BACKGROUND

1. Field of the Invention

The following description relates to a location estimation technique for devices located indoors.

2. Discussion of Related Art

Recently, various indoor devices capable of constant communication have emerged in the field of smart home or the like. In addition, various Internet of things (IoT) devices being disposed within structures such as buildings in IoT environments are emerging. Estimation of the locations of devices located indoors is required to control the devices and provide a user interface for the devices. Various studies for estimating the locations of indoor devices are being conducted.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method for estimating a location of a device at indoor, the method including measuring moving from a starting point in the room, a location of the terminal based on the starting point using a sensor, receiving a signal from the device located in the room through short-range communication, storing a plurality of first locations in which the signal is received from the device and an intensity of the signal at the plurality of first locations, determining a center point of a plurality of second locations in which the intensity of the signal is equal to or greater than a reference value at a corresponding location among the plurality of first locations or a predetermined number of locations are selected in descending order of the intensity of the signal from the plurality of first locations and determining an estimated location for the device using a probability distribution model in which a distance between the first location and the center point is a variable with respect to each of the plurality of first locations.

In another general aspect, there is provided a method for estimating a location of a device at indoor, the method including measuring a location of the terminal based on the starting point using a sensor, receiving a signal from the device located in the room through short-range communication, storing a plurality of first locations in which the signal is received from the device and an intensity of the signal at the plurality of first locations, determining a center point of a plurality of second locations in which the intensity of the signal is equal to or greater than a reference value at a corresponding location among the plurality of first locations or a predetermined number of locations are selected in descending order of the intensity of the signal from the plurality of first locations, securing map information of the room, creating a virtual location according to a location of the center point in the room, and determining a plurality of sample locations including the plurality of first locations and the virtual location and determining an estimated location for the device using a probability distribution model in which a distance between the sample location and the center point is a variable with respect to each of the plurality of sample locations.

In yet another general aspect, there is provided a method for estimating a location of a device at indoor, the method including measuring a location of the terminal based on the starting point using a sensor, receiving a signal from the device located in the room through short-range communication, storing a plurality of first locations in which an intensity of the signal is equal to or greater than a reference value among a plurality of locations where the signal is received from the device or a predetermined number of locations are selected in descending order of the intensity of the signal from the plurality of locations, and the intensity of the signal at the plurality of first locations, determining a center point of the plurality of first locations and determining an estimated location for the device using a probability distribution model in which a distance between the first location and the center point is a variable with respect to each of the plurality of first locations.

In yet another general aspect, there is provided a method for estimating a location of a device at indoor, the method including acquiring a plurality of locations in which a signal is received from the device located in the room and an intensity of the signal at the plurality of locations while measuring, by a terminal moving from a starting point in the room, a location of the terminal based on the starting point, determining a center point of a plurality of reference locations in which the intensity of the signal is equal to or greater than a reference value at a corresponding location among the plurality of locations or a predetermined number of locations are selected in descending order of the intensity of the signal from the plurality of first locations and determining an estimated location for the device using a probability distribution model in which a distance between the location and the center point is a variable with respect to each of the plurality of locations.

Figure 1:
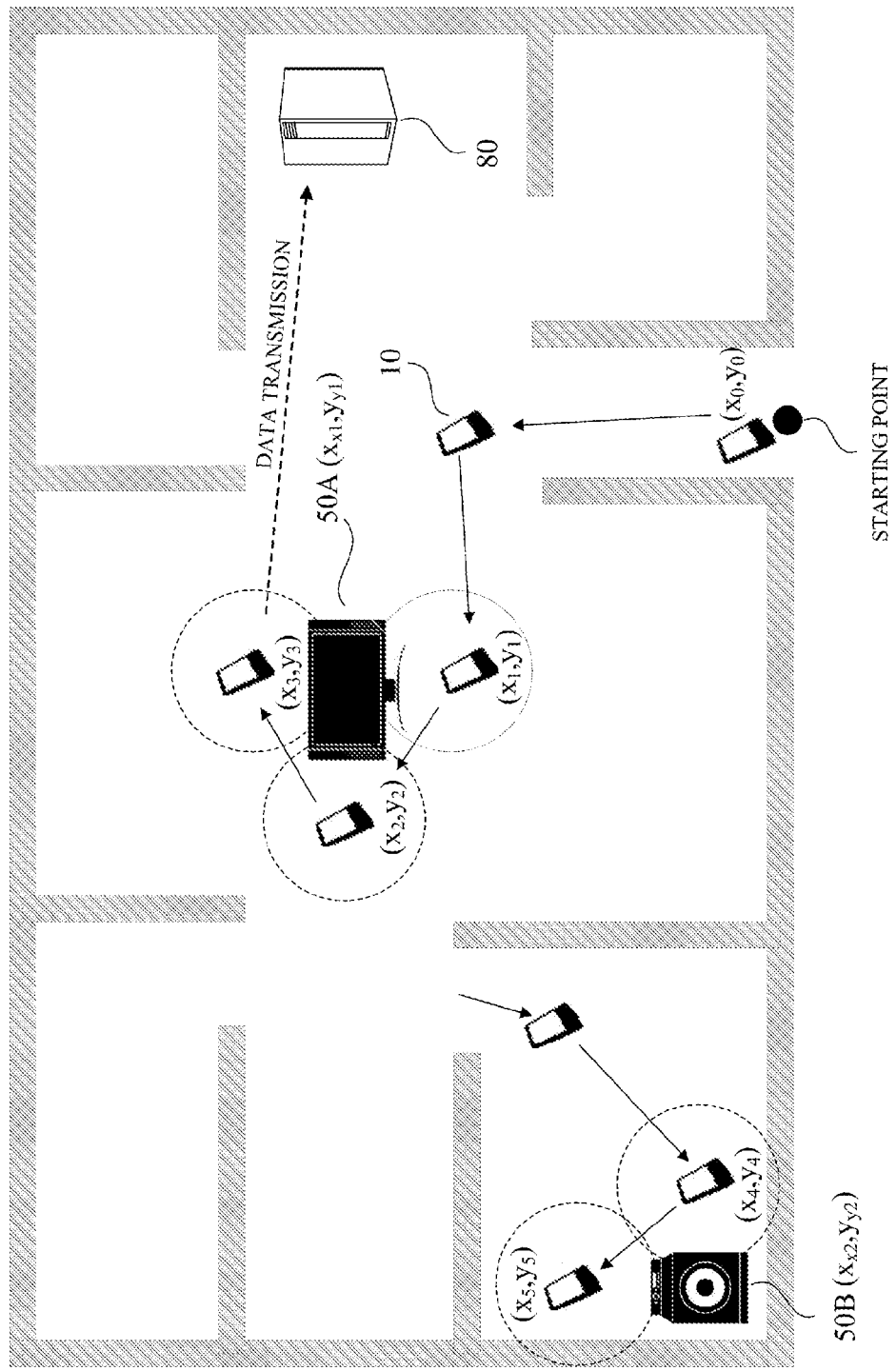
FIG. 1 illustrates an example of a process in which a terminal receives a signal of a device at indoor.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The technique described below is a technique for estimating locations of various devices located indoors. A user possesses a terminal (e.g., a smart phone) and receives a signal from a device capable of communication while moving indoors. The terminal stores a location at which a signal is received from a device and an intensity of the signal at the corresponding location. The terminal receives a signal from at least one device. When moving in coverage where communication with the device is possible, the terminal may receive a signal from the device at every moving location. Accordingly, the terminal may receive signals from even a single device at a plurality of locations.

A device refers to a variety of devices capable of communicating with a terminal. Therefore, the device should be basically a device capable of at least short-range communication. For example, the device includes various sensor devices used in an Internet of things (IoT) system, a home appliance used in a smart home environment, a CCTV, a PC, an access point (AP) device, and the like located in a building. The terminal refers to a device that communicates with a device and stores certain information. For example, the terminal includes devices such as a smart phone, a tablet PC, a notebook, and the like.

The terminal and the device mainly transmit and receive signals to and from each other through short-range communication. For example, the terminal and the device may exchange signals using various short-range wireless communication protocols such as Wi-Fi, RFID, Zigbee, NFC, Bluetooth, and the like.

FIG. 1 illustrates an example of a process in which a terminal receives a signal of a device at indoor. FIG. 1 shows a state in which devices such as home appliances are arranged in an indoor structure such as a house. FIG. 1 shows two home appliances 50A and 50B and a moving user terminal 10 in a plan view of the structure of a house. FIG. 1 is an example of a constant xy plane, and shows the locations of the terminal and home appliances as coordinates on the xy plane. The location of a TV 50A is $(x_{x1}, y_{y1})$, and the location of a washing machine 50B is $(x_{x2}, y_{y2})$.

In order to confirm the locations of the household appliances based on the structure of the house, information (drawings, etc.) indicating the structure of the house should be provided. House structure information may be obtained by the user terminal 10 or received from a separate server or the like.

The terminal 10 should be able to track its location while moving. A terminal such as a smart phone has various sensors such as an acceleration sensor, a gyroscope sensor, a magnetic force sensor, a GPS sensor, and the like. When using the GPS sensor, it is possible to estimate the location of the GPS sensor outdoors, but it may be difficult to transmit a GPS signal indoors. Therefore, it is preferable to use a method of recording the location where the user terminal 10 moves from a certain starting point (reference coordinates). For example, when using the acceleration sensor or the gyroscope sensor, it is possible to determine the relative location of the terminal in the plane. FIG. 1 is an example of tracking a path where a terminal moves from a starting point $(x_0, y_0)$ near a door. Therefore, the starting point must be set in advance, and the terminal must measure its relative location based on the starting point.

A technique for measuring the location of the terminal 10 in a room may vary. For example, a smart phone can measure a distance corresponding to a user's step width using a GPS outdoors, and estimate a moving distance according to a moving direction and the number of steps using a sensor built in the room based on the measured distance.

The terminal 10 receives a signal from a device using short-range wireless communication. For example, (1) when a terminal transmits a search signal with a constant transmission power, a device in coverage transmits a signal including its ID in response thereto. The terminal stores a location at which a signal is received from a specific device and an intensity of the signal at the corresponding location. Alternatively, (2) the device always transmits a constant signal (e.g., a response signal to a Wi-Fi beacon), and the terminal receives a signal including the ID of the device from the device. The terminal stores the location at which the signal is received from the specific device and the intensity of the signal at the corresponding location.

The terminal 10 may confirm that there is a home appliance capable of communication while approaching the TV 50A which is a home appliance during movement. In FIG. 1, a communicable radius is shown by dotted circles including the terminal 10. The terminal 10 stores the location of the moment when the signal is received from the TV 50A while approaching the TV 50A and the intensity of the signal at the corresponding location.

In FIG. 1, an example in which three locations $\{(x_1, y_1), (x_2, y_2), \text{and } (x_3, y_3)\}$ of the terminal 10 moving around the TV 50A are determined is shown. In a case in which the terminal 10 and the TV 50A continue to be in communication coverage, the terminal 10 may store a very large number of locations because the terminal 10 continues to receive signals when moving. Alternatively, the terminal 10 may receive a signal from the TV 50A at a predetermined time interval, and store a corresponding location. Alternatively, the terminal 10 may receive a signal from the TV 50A at a predetermined distance interval (that is, once every predetermined distance) and store the corresponding location.

The terminal 10 moving near the washing machine 50B which is a home appliance in another room in FIG. 1 determines and stores two locations {$(x_4,y_4)$ and $(x_5,y_5)$}.

In FIG. 1, the TV 50A is not located near a wall so that the user terminal 10 can acquire a plurality of adjacent locations surrounding the TV 50A. However, in the case of the washing machine 50B located near a wall, it is possible to acquire only an adjacent location in a certain direction around the washing machine 50B due to the wall.

The terminal 10 may estimate the location of an in-house device based on information collected by the terminal 10 itself. Further, the terminal 10 may collect only a location at which the signal is received from the device and an intensity of the signal at the corresponding location, and another computing device may estimate the location of the in-house device using the information collected by the terminal 10. The computing device refers to a device capable of processing and computing certain data such as a PC, a smart phone, a server, and the like. In FIG. 1, a server is shown as a computing device 80 in the house. As shown in FIG. 1, the terminal 10 may transmit information collected through short-distance wireless communication, mobile communication, the Internet, and the like to the computing device 80. Alternatively, the computing device 80 may receive the information collected by the terminal 10 via a physical storage medium such as an SD card.

Figure 2:
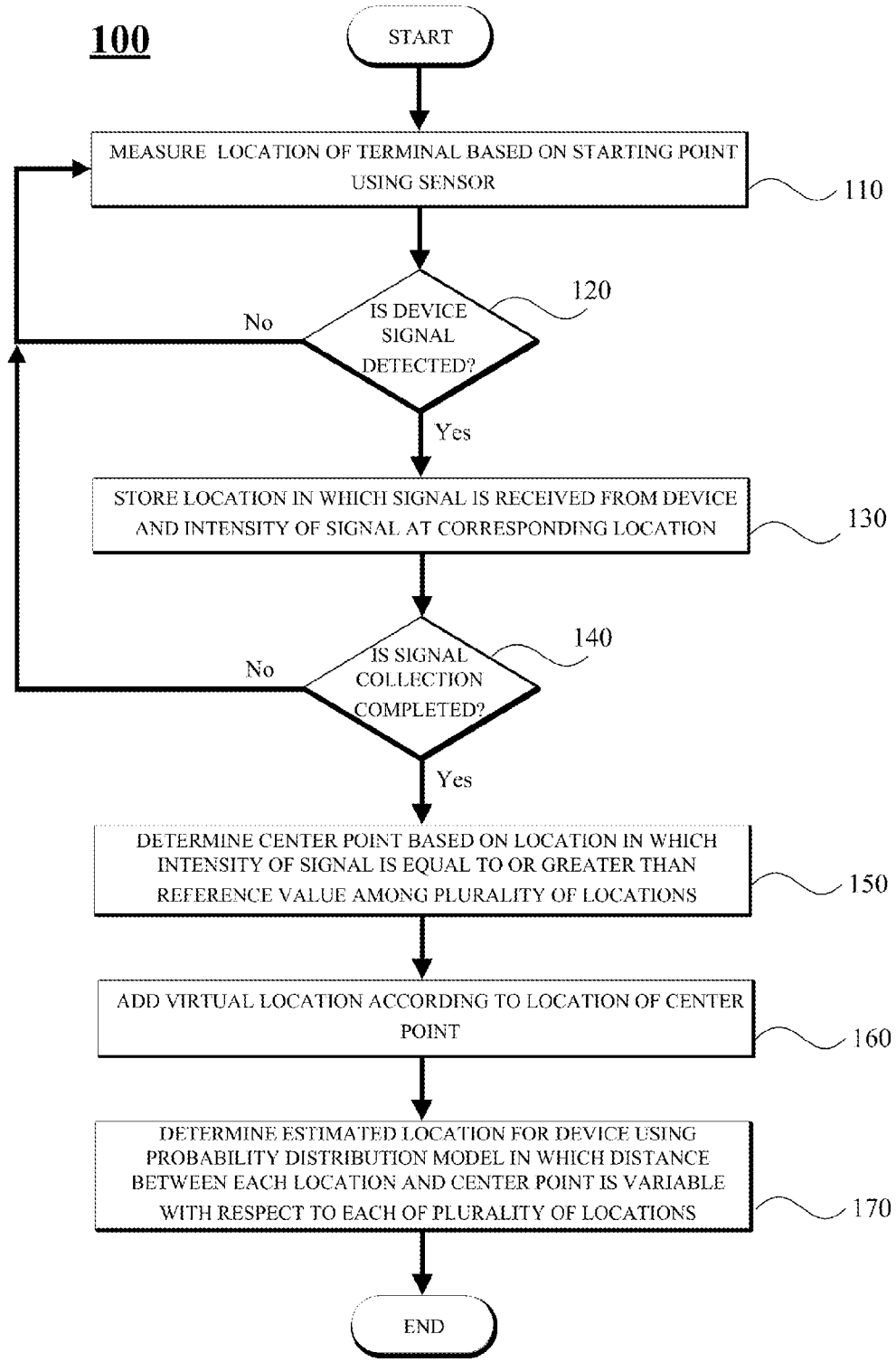
FIG. 2 illustrates a flowchart of an example of a method of estimating a location of an indoor device.

FIG. 2 illustrates a flowchart of an example of a method of estimating a location of an indoor device. FIG. 2 is an example in which the terminal 10 directly estimates the location of a device. When there are a plurality of devices, the location estimation for the devices is performed on a device-by-device basis. When there are a plurality of devices, the terminal 10 receives and stores IDs of the devices. Hereinafter, for convenience of description, one device will be described as an example.

In operation 110, the terminal 10 measures its own location based on a starting point using a sensor while moving from the starting point indoors. In operation 120, the terminal 10 monitors whether it receives a signal from a device 50 while measuring its own location. When it does not detect the signal of the device 50, the terminal 10 monitors the signal detection while continuously measuring its own location.

In operation 130, when the terminal 10 detects the signal from the device 50, it stores a location at which the signal is received and an intensity of the signal at the corresponding location. When signal collection is not completed (No in operation 140), the terminal 10 monitors whether it receives a signal from the device 50 while measuring its own location. When the signal collection is completed (Yes in operation 140), the terminal 10 estimates the location of the device 50 based on data collected by the terminal 10 itself.

The terminal 10 determines a location where the intensity of the signal at the corresponding location among a plurality of locations with respect to the device 50 is equal to or greater than a reference value. In operation 150, the terminal 10 determines a center point of the location where the intensity of the signal is equal to or greater than the reference value. Meanwhile, in operation 160, the terminal 10 may add virtual location data according to the location of the center point. In operation 170, the terminal 10 determines an estimated location for the device using a probability distribution model in which a distance between each location and the center point is a variable with respect to each of the plurality of locations. A detailed process in which the terminal 10 estimates the location of the device 50 will be described later.

Figure 3:
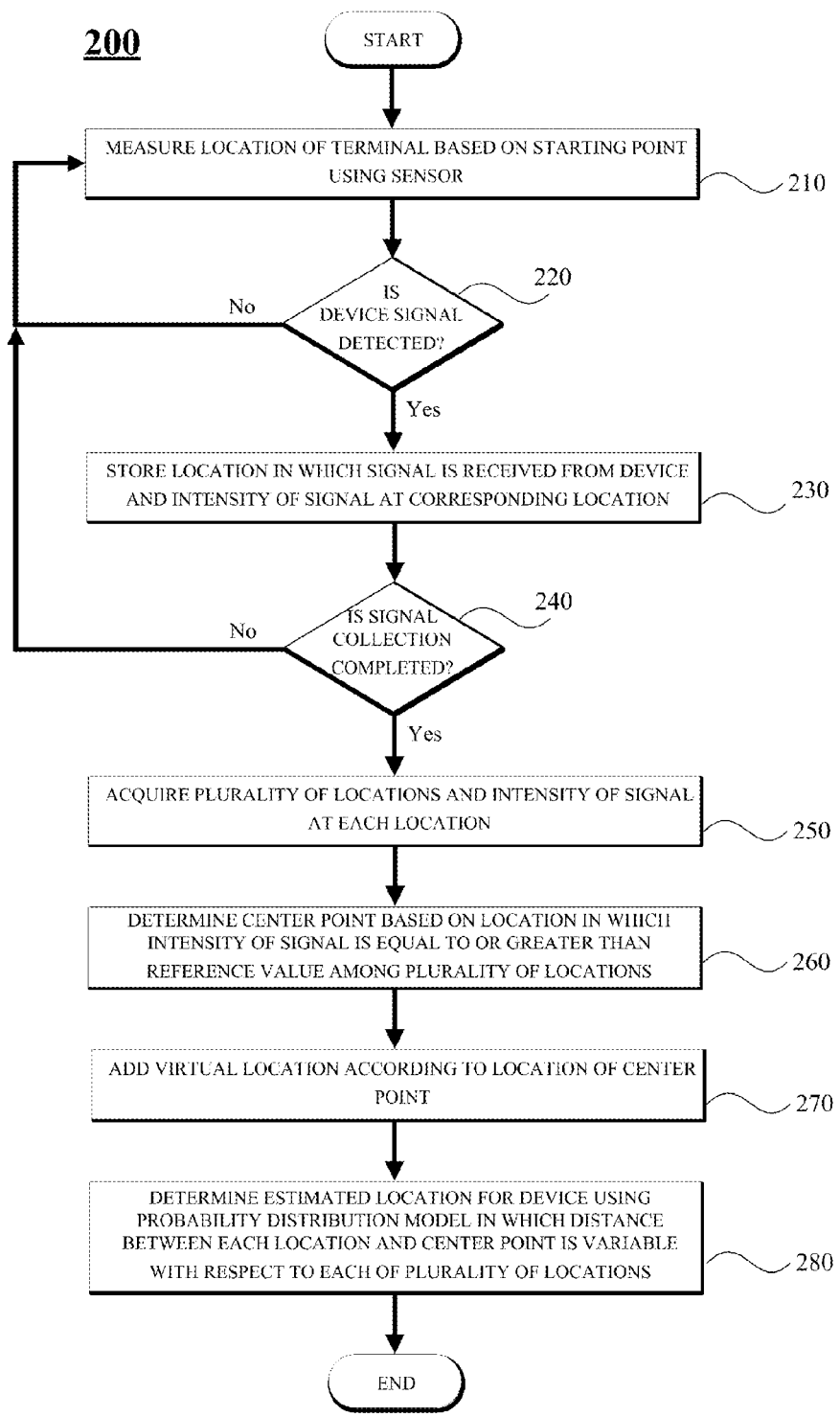
FIG. 3 illustrates a flowchart of another example of a method of estimating a location of an indoor device.

FIG. 3 illustrates a flowchart of another example of a method of estimating a location of an indoor device. FIG. 3 is an example in which a separate computing device 80 estimates a location of a device. Hereinafter, for convenience of description, one device will be described as an example.

In operation 210, a terminal 10 measures its own location based on a starting point using a sensor while moving from the starting point indoors. In operation 220, the terminal 10 monitors whether it receives a signal from a device 50 while measuring its own location. When it does not detect the signal of the device 50, the terminal 10 monitors the signal detection while continuously measuring its own location.

In operation 230, when detecting the signal from the device 50, the terminal 10 stores a location at which the signal is received and an intensity of the signal at the corresponding location. When signal collection is not completed (No in operation 240), the terminal 10 monitors whether it receives a signal from the device 50 while measuring its own location. In operation 250, when the signal collection is completed (Yes in operation 240), the terminal 10 transmits data collected by the terminal 10 itself to a computing device 80. In other words, in operation 250, the computing device 80 acquires a plurality of locations collected by the terminal and an intensity of the signal at each location.

The computing device 80 determines a location where the intensity of the signal at the corresponding location among the plurality of locations with respect to the device 50 is equal to or greater than a reference value. In operation 260, the terminal 10 determines a center point of the location where the intensity of the signal is equal to or greater than the reference value. Meanwhile, in operation 270, the computing device 80 may add virtual location data according to the location of the center point. In operation 280, the computing device 80 determines an estimated location for the device using a probability distribution model in which a distance between each location and the center point is a variable for each of the plurality of locations. A detailed process in which the computing device 80 estimates the location of the device 50 will be described later.

Figure 4:
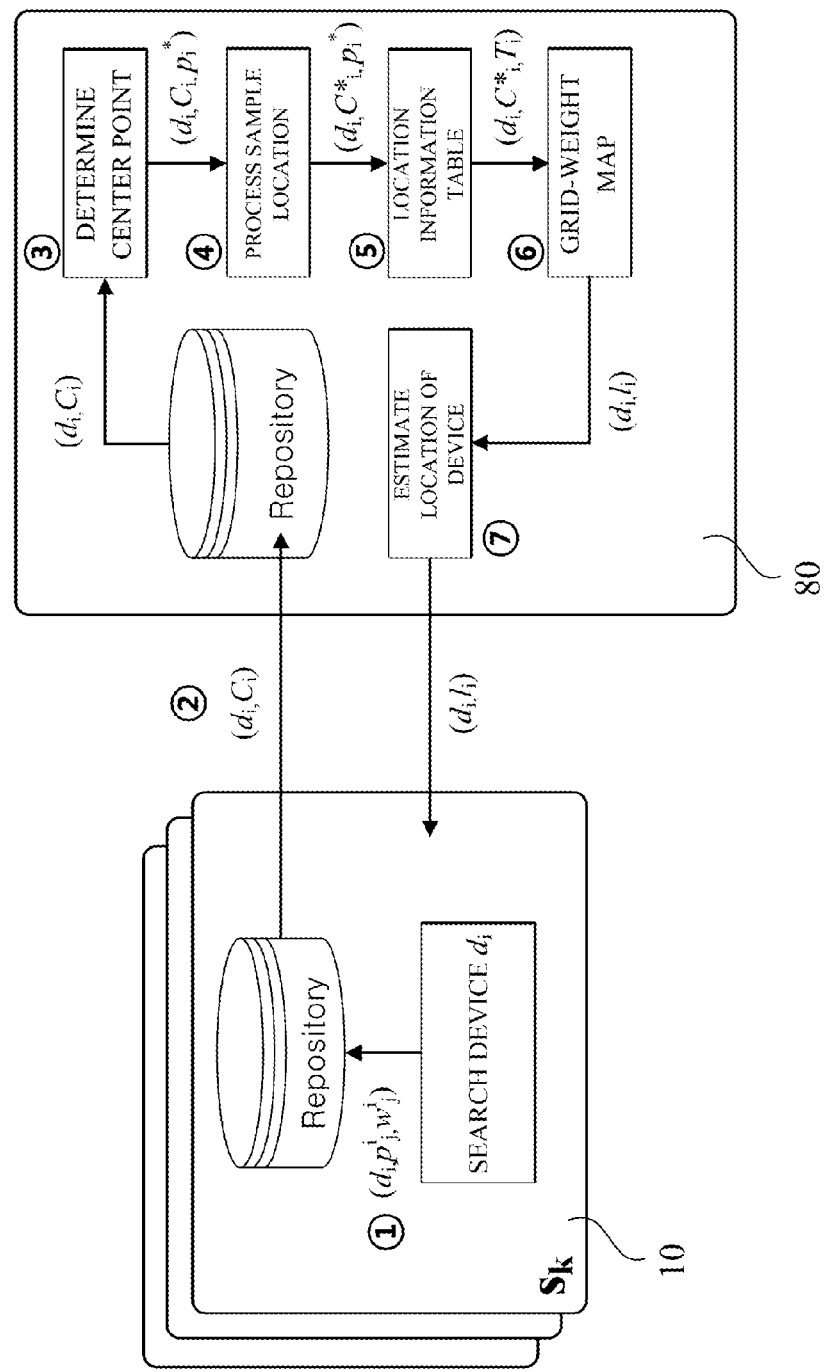
FIG. 4 illustrates an example of an operation of estimating a location of an indoor device in a terminal and a computing device.

FIG. 4 illustrates an example of an operation of estimating a location of an indoor device in a terminal and a computing device. FIG. 4 is an example in which a computing device 80 estimates a location of a device 50 based on data collected by a terminal 10. Hereinafter, for convenience of description, it is assumed that a specific computing device 80 estimates the location of the device 50. Obviously, the terminal 10 which has collected location information may directly estimate the location of the device 50.

(1) Device Search

In FIG. 4, a terminal $S_k$ (10) searches for a device $d_i$ (50). The indication of the terminal 10 as $S_k$ means that a plurality of terminals can be used. $S_k$ is information for identifying a specific terminal k among the plurality of terminals (n count). That is, the plurality of terminals may collect data while moving in the same indoor area. At this time, the terminal $S_k$ searches for a device $d_i$, at indoor. $d_i$ is information for identifying a specific device i among the plurality of terminals.

The terminal $S_k$ continuously measures its relative location based on the starting point. When approaching a distance communicable with the device $d_i$, the terminal $S_k$ receives a signal having an intensity $w^i_j$ from the device $d_i$ at a location $p^i_j$ which is the location of the terminal $S_k$. $p^i_j$ denotes a location j of the terminal $S_k$ that receives a signal from the device $d_i$. $w^i_j$ denotes an intensity of a signal which the terminal $S_k$ receives from the device $d_i$ at a location $p^i_j$. The terminal $S_k$ may transmit a certain signal request message and receive a response signal to the request message from the device $d_i$. Alternatively, the terminal $S_k$ may receive a signal that the device $d_i$ continuously or periodically transmits.

The terminal $S_k$ stores ID of the device $d_i$, the location $p^i_j$ where a signal is received, and the intensity $w^i_j$ of the signal. The terminal $S_k$ collects $C_i=(d_i, p^i_j, w^i_j)$ for all of devices that have received signals indoors. The terminal $S_k$ stores the collected information $C_i=(d_i, p^i_j, w^i_j)$ in a repository (①) in FIG. 4). The terminal $S_k$ transmits the collected information $C_i$ to the computing device 80 (② in FIG. 4). The computing device 80 estimates the location of the device $d_i$ using the information collected by the terminal $S_k$ with respect to the device $d_i$.

In order to estimate a more accurate location of the device $d_i$, the number of pieces of data contained in $C_i$ should be large. That is, the terminal $S_k$ should receive signals from the device $d_i$ while sufficiently moving everywhere in the room. A location where the signal is received from the device $d_i$ stored by the terminal 10 is hereinafter referred to as a sample location. $C_i$ is hereinafter referred to as sample location data.

(2) Determine Center Point for Location where Signal is Received

The computing device 80 determines a first candidate location which is close to the device $d_i$ using the location $p^i_j$ of the terminal 10 that has received a signal from the device $d_i$. The first candidate location may be a center point for the location $p^i_j$ of the terminal 10 that has received a signal from the device $d_i$. Alternatively, the first candidate location may be a center point for the location $p^i_j$ of the terminal 10 that has received a signal having an intensity of a predetermined reference value or more from the device $d_i$. It is highly likely that the computing device 80 determines the first candidate location that is relatively close to the device $d_i$, by using a signal above a certain reference value.

For convenience of description, it is assumed that pij is two-dimensional coordinate information $(x_j, y_j)$. As a result, the sample location data $C_i$, corresponds to a set of $(x_j, y_j, w_j)$. The computing device 80 may use only data whose signal intensity $w_j$ is equal to or greater than a predetermined reference value from $C_i$ or data belonging to a higher reference range in order of the intensity of the signal. The higher reference range may be, for example, the top 10 locations where the order of the intensity of the signals is strong.

The first candidate location (center point, $p^*_i$) has a location of $p^*_i=(x^*_i, y^*_i)$. The computing device 80 may determine the location $p^*_i$ through the following Equation 1 (③ in FIG. 4).

$$x^*_i = \frac{1}{m}\sum_{x_k \in C^*_i} x_k,$$

$$y^*_i = \frac{1}{m}\sum_{y_k \in C^*_i} y_k.$$

[Equation 1]

Here, m denotes the number of sample locations used for determining the center point.

Figure 5:
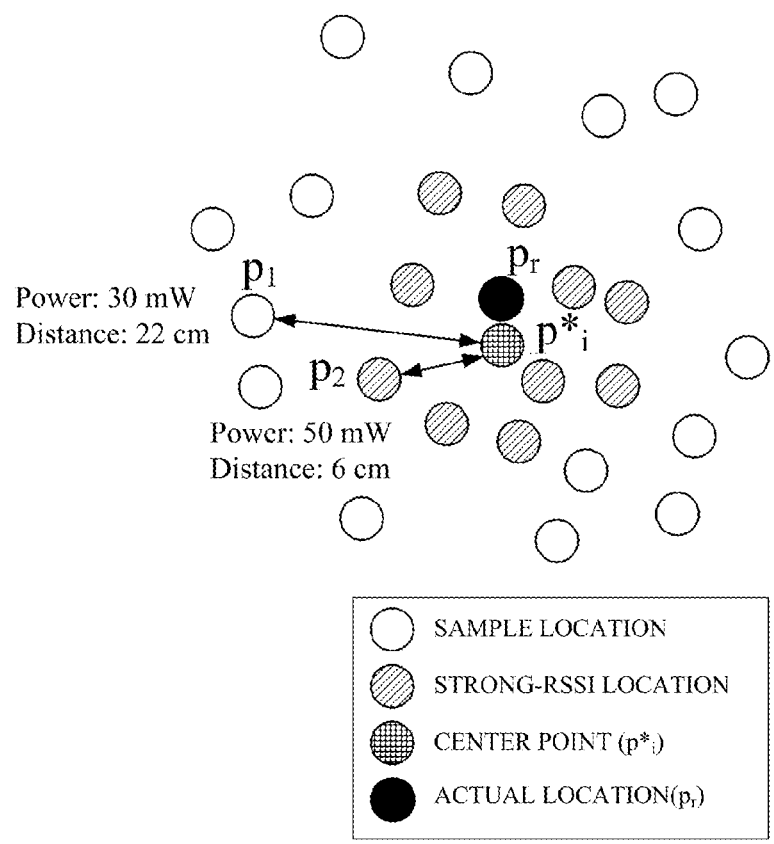
FIG. 5 illustrates an example of a plurality of locations and a center point at which a signal of a device is received.

FIG. 5 illustrates an example of a plurality of locations and a center point at which a signal of a device is received. A terminal 10 receives a certain signal from a device $d_i$, and stores a sample location at which the signal is received. FIG. 5 is an example in which a computing device 80 determines sample locations corresponding to the top 10 based on the intensity of the signal, and determines a center point $p^*_i$ of 10 sample locations. In FIG. 5, the top 10 sample locations based on the intensity of the signal are denoted as Strong-RSSI locations. Referring to FIG. 5, it can be seen that the center point $p^*_i$ that is the first candidate location is relatively close to a location $P_r$ of the actual device $d_i$ but has a slight difference from the location $P_r$ of the actual device $d_i$. Accordingly, the computing device 80 may perform a process described below to determine an estimated location that is closer to the actual location.

(3) Sample Location Processing

The device $d_i$ is located indoors. Unlike outdoors, there is a structure such as a wall indoors. When the device $d_i$ is located near the wall, the terminal 10 has to be located in an area in a certain direction based on the device $d_i$. When the device $d_i$ is located near a wall or a corner, it is preferable to process the sample location (④ in FIG. 4). This is because it is possible to estimate the location of the device with high accuracy when the sample location is evenly distributed around the device $d_i$. For sample location processing, the computing device 80 needs to know structure information about the room in advance. For example, the computing device 80 should acquire map data for the structure of the room in advance.

Figure 6:
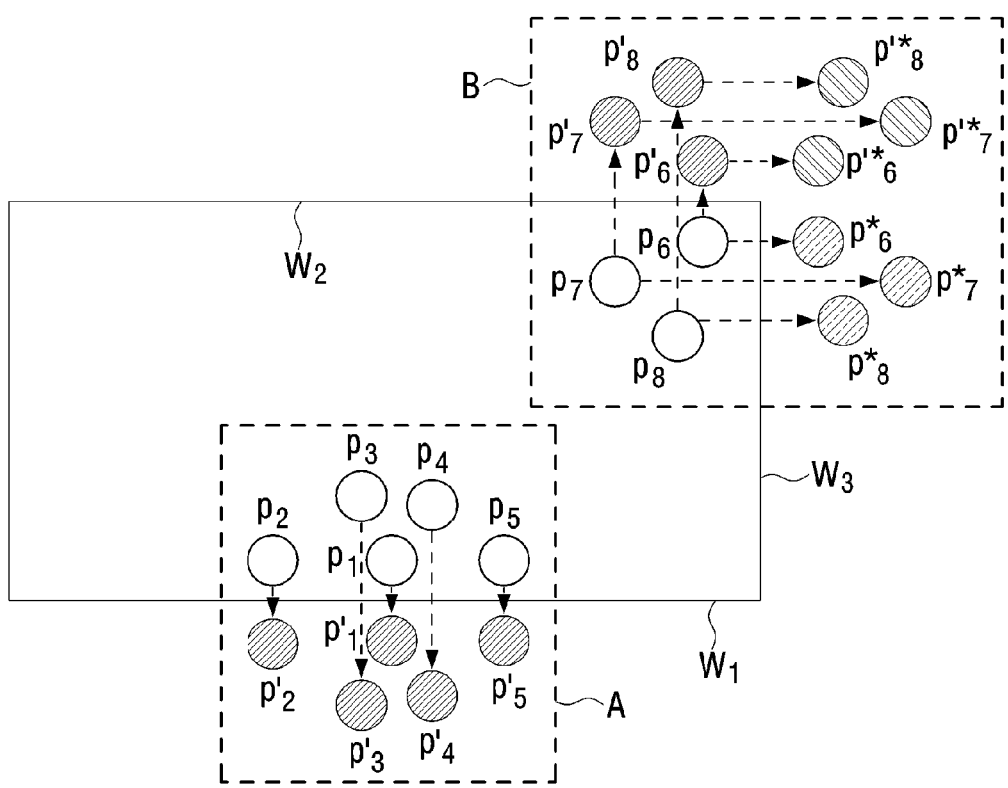
FIG. 6 illustrates an example of processing a location at which a signal of a device is received near a wall and a corner to add a sample location.

FIG. 6 illustrates an example of processing a location at which a signal of a device is received near a wall and a corner to add a sample location. A computing device 80 may determine whether a device $d_i$ is close to a wall or corner based on whether a previously determined first candidate location (center point, $p^*_i$) is close to a wall or a corner.

An area A in FIG. 6 is an example of sample location processing for a case in which the device $d_i$ is located near a wall. When the device $d_i$ is located near the wall, the terminal 10 may collect only signals of locations of about ½ compared to a case in which the device $d_i$ is located in the center of the room. The computing device 80 may create a virtual location $P'_j$ at a point symmetrical to a wall (a straight line corresponding to a wall) with respect to a sample location $P_j$ where a signal is received from the device $d_i$. The computing device 80 adds the newly created virtual location $P'_j$ as the sample location. Meanwhile, the computing device 80 may not create a virtual location for all sample locations, but create a virtual location only for a certain sample location. For example, the computing device 80 may create the virtual location only for the location in which an intensity of a signal is equal to or greater than a reference value among the sample locations, or only for several top locations in order of the intensity of the signal. In FIG. 6, actually collected sample locations are indicated by solid line circles, and the created virtual locations are indicated by shades. FIG. 6 shows an example in which virtual locations $P'_1$, $P'_2$, $P'_3$, $P'_4$, and $P'_5$ based on a wall $W_1$ are created for sample locations $P_1$, $P_2$, $P_3$, $P_4$, and $P_5$ in the area A.

An area B in FIG. 6 is an example of sample location processing for a case in which the device $d_i$ is located near a corner. When the device $d_i$ is located near the corner, the terminal 10 may collect only signals of locations of about ¼ compared to a case in which the device $d_i$ is located in the center of the room. The corner is a point surrounded by two walls. The computing device 80 creates a virtual location $P'_j$ at a point symmetrical to a first wall (a straight line corresponding to a wall) constituting the corner with respect to a sample location $P_j$ where a signal is received from the device $d_i$, and creates a virtual location $P^*_j$ symmetrical to $P_j$ and $P'_j$ based on a second wall constituting the corner again. Finally, the computing device 80 adds the virtual locations $P'_j$ and $P^*_j$ as the sample locations. Even at the corners, the computing device 80 may create a virtual location only for a certain sample location rather than creating virtual locations for all sample locations. For example, the computing device 80 may create the virtual location only for the location in which an intensity of a signal is equal to or greater than a reference value among the sample locations or only for several top locations in order of the intensity of the signal. FIG. 6 shows an example in which first virtual locations $P'_6$, $P'_7$, and $P'_8$ based on a wall $W_2$ are created for sample locations $P_6$, $P_7$, and $P_8$ in the area B, and first virtual locations $P^*_6$, $P^*_7$, $P^*_8$, $P'^*_6$, $P'^*_7$, and $P'^*_8$ based on a wall $W_3$ are created for $P_6$, $P_7$, $P_8$, $P'_6$, $P'_7$, and $P'_8$.

(4) Create Location Information Table Using Sample Location

An information set about a new sample location including even a virtual locations is denoted by $C^*_i$. The computing device 80 creates a location information table using data such as $d_i$, $C^*_i$ and $P^*_i$ as shown in FIG. 4 (⑤ in FIG. 4). The location information table is then used to create a grid-weight map.

(i) The computing device 80 first determines a distance between each of all sample locations $P_j$ and a first candidate location (center point, $p^*_i$). The computing device 80 computes a Euclidean distance between the sample location $P_j$ and the first candidate location $p^*_i$. In FIG. 5, an example of measuring a distance (22 cm) between the sample location $P_1$ and $p^*_i$ and a distance (6 cm) between the sample location $P_2$ and $p^*_i$ is shown.

(ii) The computing device 80 computes a mean value of distance values with respect to the sample location $P_j$. Here, the mean value refers to a mean value of distance values of other sample locations around the sample location $P_j$. The other sample locations around the sample location $P_j$ are hereinafter referred to as adjacent sample locations. The computing device 80 may determine a sample location around the sample location $P_j$ based on the actual location as an adjacent sample location. In addition, more preferably, the computing device 80 may determine another sample location having an intensity that is uniformly close to a reference intensity based on a signal intensity (the reference intensity) at the sample location $P_j$ as an adjacent sample location.

Figures 7A, 7B:
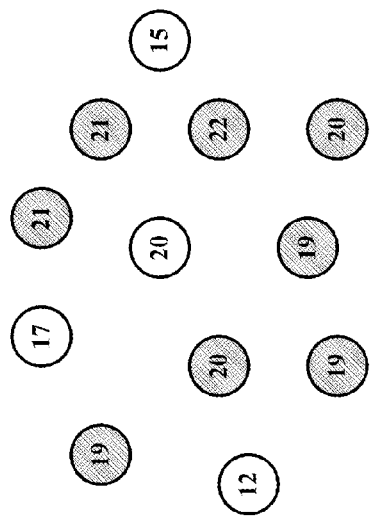
FIGS. 7A and 7B illustrate examples of an adjacent sample location and a location information table for a sample location.

FIGS. 7A and 7B illustrate examples of an adjacent sample location and a location information table for a sample location. FIG. 7A is an example showing an adjacent sample location with respect to the sample location $P_j$. In FIG. 7A, solid line circles indicate sample locations, and numeral values in the circles indicate signal intensities at corresponding locations. In FIG. 7A, the sample location $P_j$ has a signal intensity 20. The computing device 80 may determine a plurality of sample locations (adjacent sample locations) having signal intensities close to the signal intensity 20. In FIG. 7A, the adjacent sample locations are indicated by shades. In FIG. 7A, the number of the adjacent sample locations is determined to be 8. The computing device 80 computes a mean value $\mu_j$ of distance values for the sample location $P_j$. The mean value $\mu_j$ of the distance values is a value obtained by averaging a sum of a distance value between the sample location $P_j$ and a first candidate location $p^*_i$ and a distance value between each of a plurality of adjacent sample locations for the sample location $P_j$ and the first candidate location $p^*_i$.

(iii) Finally, the computing device 80 computes a standard deviation value $\sigma_j$ of the distance value with respect to the sample location $P_j$. The computing device 80 computes a standard deviation of the distance using the sample location $P_j$ and the adjacent sample location of the sample location $P_j$ as a population.

FIG. 7B is an example of a location information table. In FIG. 7B, a location information table for n sample locations is shown. First, the computing device 80 stores the sample location $P_j$ initially collected by a terminal 10 and an intensity $w_j$ of the signal in the table. Next, the computing device 80 computes a Euclidean distance $l_j$ between each sample location $P_j$ and the first candidate location $p^*_i$, and stores the computed distance in the table. Next, for convenience of description, the computing device 80 may sort values stored in the table in descending order or ascending order based on the intensity of the signal.

The computing device 80 computes and stores the mean value $\mu_j$ of the distance values using the distance value between the sample location and the adjacent sample location with respect to each sample location $P_j$ based on the sorted items. Finally, the computing device 80 computes and stores the standard deviation value $\sigma_j$ of the distance value using the distance value between the sample location and the adjacent sample location. The computing device 80 may determine a predetermined number of sample locations adjacent to the left side of the sample location $P_j$ and the predetermined number of sample locations adjacent to the right side of the sample location $P_j$ in the sorted items as the adjacent sample locations. Alternatively, the computing device 80 may determine all sample locations which are close to the sample location within a certain reference range in which the signal intensity is constant as the adjacent sample locations.

(5) Determine Final Estimated Location Using Grid-Weight Map

The computing device 80 creates a grid-weight map using a location information table (⑥ in FIG. 4). In FIG. 4, a location information table for the sample location $P_j$ is indicated by $T_i$. The grid-weight map is for determining a final estimated location for the device $d_i$.

Figure 8:
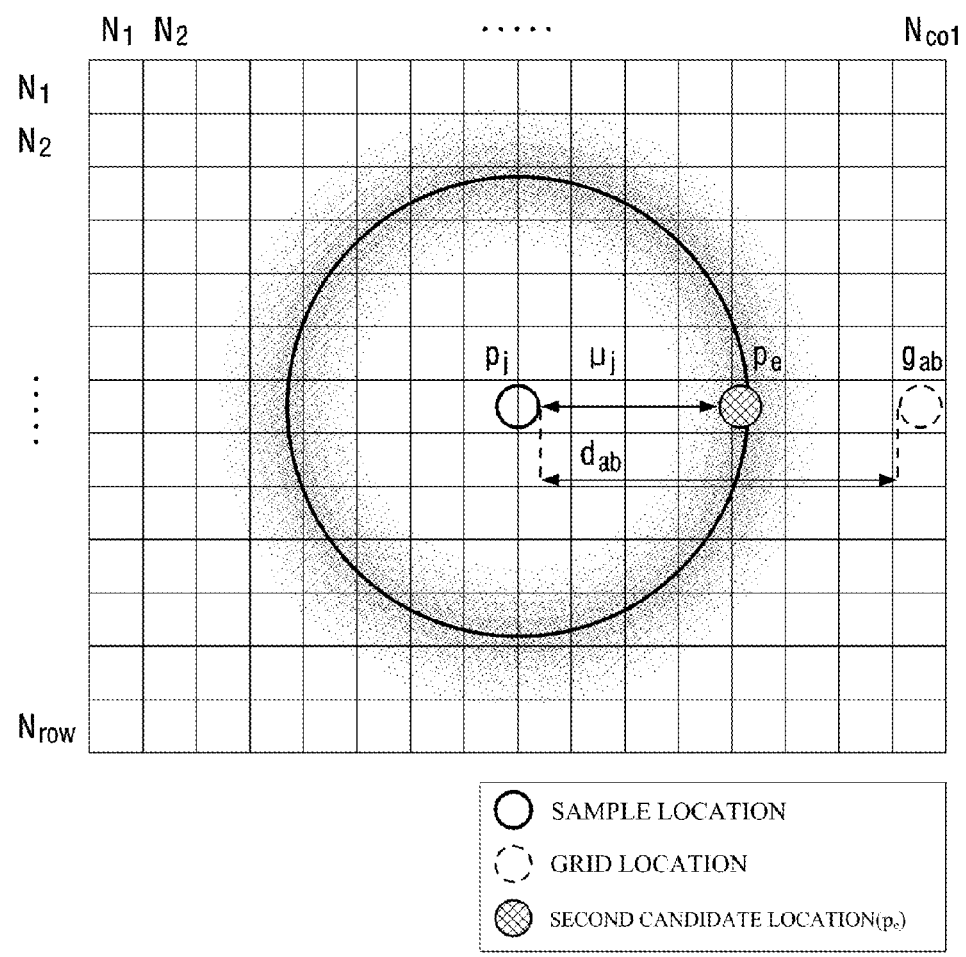
FIG. 8 illustrates an example of a grid-weight map for a location at which a signal of a device is received.

FIG. 8 illustrates an example of a grid-weight map for a location at which a signal of a device is received. FIG. 8 is an example of a grid-weight map configured based on a mean value of distance values for a sample location $P_j$. The computing device 80 first divides an area where the sample location is located into a plurality of grid cells as shown in FIG. 8. The size of the grid cell is determined to be a suitable size (for example, 1 cm×1 cm) according to the width of the indoor structure.

It is highly likely that an actual device $d_i$ is located at a distance corresponding to a mean value of the distance values (hereinafter, referred to as a mean value) from the sample location $P_j$. In FIG. 8, one of locations apart from the sample location $P_j$ by a distance of the mean value $\mu_j$ is referred to as a second candidate location $P_e$. However, it is not yet known whether the final estimated location for the device $d_i$ (hereinafter, referred to as a final estimated location) is likely to be located in a circumference having a radius $\mu_j$ with respect to the sample location $P_j$ or at which point the final estimated location for the device $d_i$ is exactly located.

In order to determine the final estimated location for the device $d_i$, the computing device 80 assigns a constant weight to each grid cell of FIG. 8 and determines that the center point of the grid cell having the highest weight is the final estimated location. The shortest distance between the grid cell and the sample location $P_j$ is determined with respect to each grid cell to determine the weight for the grid cell.

In FIG. 8, a grid has $N_1$ to $N_{row}$ rows and $N_1$ to $N_{col}$ columns. In FIG. 8, a grid cell at a location $g_{ab}$ is shown as an example, and the shortest distance between $g_{ab}$ and $P_j$ is indicated by $d_{ab}$. Here, a is the row number and b is the column number.

The weight for the grid cell uses a value indicating a probability that the device $d_i$ is located in a corresponding grid cell. The probability that the device $d_i$ is located in the corresponding grid cell may be determined using a normal distribution $N(\mu_j, \sigma_j)$. $\mu_j$ is a mean value for the sample location $P_j$, and $\sigma_j$ is a standard deviation value for the sample location $P_j$.

Figure 9:
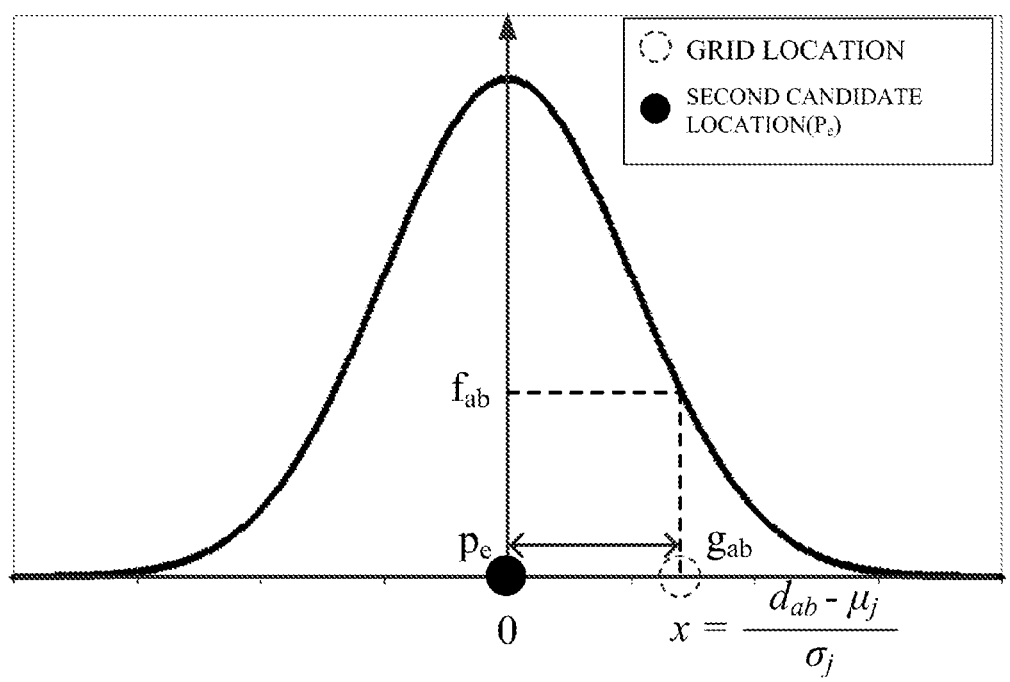
FIG. 9 illustrates an example of a graph showing a probability distribution for a grid-weight map.
Figure 10:
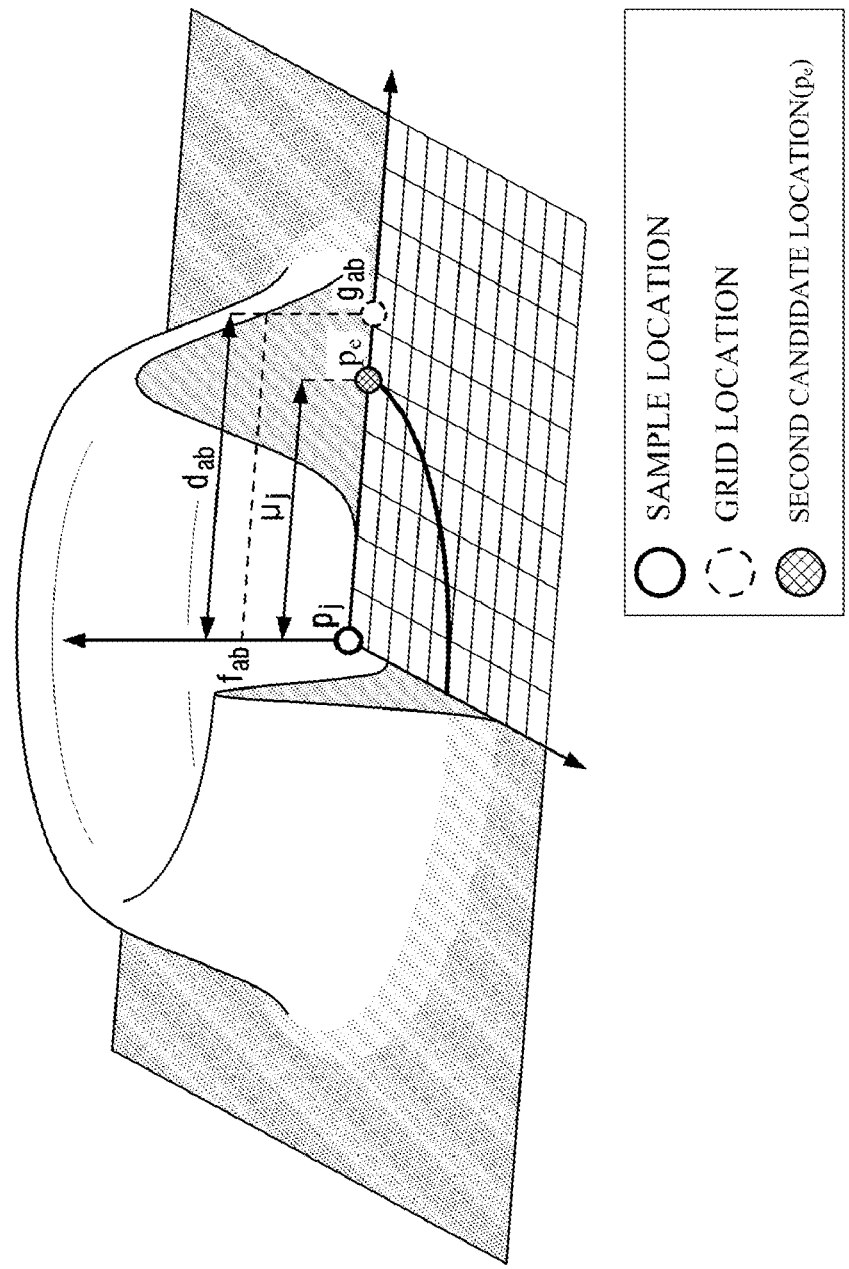
FIG. 10 illustrates an example of a graph showing a three-dimensional (3D) probability distribution for a grid-weight map.

FIG. 9 illustrates an example of a graph showing a probability distribution for a grid-weight map. FIG. 9 is an example showing a probability distribution for the grid-weight map of FIG. 8. FIG. 10 illustrates an example of a graph showing a three-dimensional (3D) probability distribution for a grid-weight map. FIG. 10 is an example showing a 3D probability distribution for the grid-weight map of FIG. 8. $f_{ab}$ is a function that represents a value obtained by normalizing a probability in a normal distribution $N(0,1)$. $f_{ab}$ represents a value obtained by normalizing a probability for the sample location $P_j$ using a formula $$\frac{d_{ab} - \mu_j}{\sigma_j}.$$

In FIG. 9, a value obtained by normalizing a probability for the grid cell gab $g_{ab}$ based on the sample location $P_j$ is denoted by x.

The computing device 80 sets a weight for each initial grid as a constant initial value 0, and then assigns the probability for each grid cell to each of all sample locations $P_j$ as a weight. As the probability, a normalized value can be used as described above. Finally, the computing device 80 determines the grid cell with the highest weight among the grid cells as a final estimated location for the device $d_i$ (⑦ in FIG. 4).

The following algorithm 1 (algorithm 1) is an example of a pseudo code for a process of assigning a weight to a grid map.

| Algorithm 1 Grid-Weight Map Computation Algorithm |
| --- |
| 1: function Grid_Weight_Map(C,T) |
| 2:    M = ($m_{ab}$) ← 0 for a = 1, ..., $N_{row}$ and b = 1, ..., $N_{col}$ |
| 3:    for all $p_j$ ∈ C do |
| 4:       [$l_j$, $\mu_j$, $\sigma_j$] ← Get_Table_Entry(T, $p_j$) |
| 5:       for a ← 1, $N_{row}$ do |
| 6:          for b ← 1, $N_{col}$ do |
| 7:             $d_{ab}$ ← Get_Distance($p_j$, $g_{ab}$, $l_j$) |
| 8:             $f_{ab}$ ← Get_Probability($d_{ab}$, $\mu_j$, $\sigma_j$) |
| 9:             $m_{ab}$ ← $m_{ab}$ + $f_{ab}$ |
| 10:          end for |
| 11:       end for |
| 12:    end for |
|       return M |
| 13: end function |

Hereinafter, the algorithm 1 will be briefly described. In the algorithm 1, input data uses a location information table T and sample location data C. The location information table and sample location data for all sample locations are used as input values. A grid-weight map is denoted by M. In a line 2, a weight for the grid-weight map is initialized to zero. Lines 3 to 12 are a process of assigning a weight to the grid-weight map. The process of assigning the weight is performed on all sample locations based on values stored in the location information table (line 3). The process of assigning the weight based on one sample location $P_j$ will be described. First, the shortest distance $d_{ab}$ between the sample location $P_j$ and each grid cell is computed (line 7). Next, a normalized probability $f_{ab}$ between the sample location $P_j$ and each grid cell is computed (line 8). Next, the probability $f_{ab}$ is cumulatively added to each grid cell (line 9). Thus, the algorithm 1 transmits the grid-weight map to which the weight is assigned (line 12). Finally, the grid cell having the largest weight is selected as the final estimated location.

The technique described above may estimate the location of a communicable device located in a room using a terminal possessed by a user without separate additional equipment. The technique described above may estimate the location of an indoor device even in an environment where a wireless AP is not installed in a room. For example, based on the technique described above, various location-based services may be provided even in an indoor environment such as a building, an underground shopping mall, a shopping mall, a factory, and the like.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for estimating a location of a device at indoor comprising:
    measuring, by a terminal moving from a starting point in the room, a location of the terminal based on the starting point using a sensor;
    receiving, by the terminal, a signal from the device located in the room through short-range communication;
    storing, by the terminal, a plurality of first locations in which the signal is received from the device and an intensity of the signal at the plurality of first locations;
    determining, by the terminal or a computing device, a center point of a plurality of second locations in which the intensity of the signal is equal to or greater than a reference value at a corresponding location among the plurality of first locations or a predetermined number of locations are selected in descending order of the intensity of the signal from the plurality of first locations; and
    determining, by the terminal or the computing device, an estimated location for the device using a probability distribution model in which a distance between the first location and the center point is a variable with respect to each of the plurality of first locations.

2. The method for estimating a location of a device at indoor of claim 1, wherein the computing device receives the plurality of locations and the intensity of the signal from the terminal.

3. The method for estimating a location of a device at indoor of claim 1, wherein
    the terminal or the computing device secures map information of the room in advance, and
    the determining of the estimated location includes adding, by the terminal or the computing device, a location symmetrical to at least one location among the plurality of first locations based on a wall of the room to the plurality of first locations when the center point is within a reference distance from the wall of the room.

4. The method for estimating a location of a device at indoor of claim 1, wherein
    the terminal or the computing device secures map information of the room in advance, and
    the determining of the estimated location includes creating, by the terminal or the computing device, a virtual third location symmetrical to at least one location among the plurality of first locations based on a first wall constituting a corner of the room when the center point is within a reference distance from the corner of the room, creating a virtual fourth location symmetrical to the at least one location and the third location based on a second wall constituting the corner, and adding the third location and the fourth location to the plurality of first locations.

5. The method for estimating a location of a device at indoor of claim 1, wherein
    the determining of the estimated location includes computing, by the terminal or the computing device, a normal distribution having a mean value and a standard deviation value for the distance with respect to each of the plurality of first locations, and determining a point having a highest distribution value from a result of summing the normal distribution for each of the plurality of first locations as the estimated location, wherein
    the mean value for any one first location among the plurality of first locations is a mean value for the distance at one or more locations in which the intensity of the signal is similar to the intensity of the signal at any one first location and the standard deviation value is a standard deviation for the distance at the one or more locations.

6. The method for estimating a location of a device at indoor of claim 1, wherein the determining of the estimated location includes
    computing, by the terminal or the computing device, a normal distribution ($N(\mu_j, \sigma_j)$) having a mean value $\mu_j$ and a standard deviation value $\sigma_j$ for the distance with respect to each of the plurality of first locations $p_j$,
    dividing, by the terminal or the computing device, an area in which the plurality of first locations are located into a plurality of grid cells,
    assigning a probability for a value obtained by dividing a difference between a distance between the first location $p_j$ and any one grid cell and the mean value $\mu_j$ by the standard deviation value $\sigma_j$ in the normal distribution for each of the plurality of grid cells, to each of the plurality of first locations $p_j$ as a weight, and
    determining, by the terminal or the computing device, a grid cell having a largest sum of the weights among the plurality of grid cells as the estimated location, wherein the mean value $\mu_j$ is a mean value for the distance at one or more locations in which the intensity of the signal is similar to the intensity of the signal at any one first location $p_j$, and the standard deviation value $\sigma_j$ is a standard deviation for the distance at the one or more locations.

7. A method for estimating a location of a device at indoor comprising:
    measuring, by a terminal moving from a starting point in the room, a location of the terminal based on the starting point using a sensor;
    receiving, by the terminal, a signal from the device located in the room through short-range communication;
    storing, by the terminal, a plurality of first locations in which the signal is received from the device and an intensity of the signal at the plurality of first locations;
    determining, by the terminal or a computing device, a center point of a plurality of second locations in which the intensity of the signal is equal to or greater than a reference value at a corresponding location among the plurality of first locations or a predetermined number of locations are selected in descending order of the intensity of the signal from the plurality of first locations;
    securing, by the terminal or the computing device, map information of the room, creating a virtual location according to a location of the center point in the room, and determining a plurality of sample locations including the plurality of first locations and the virtual location; and
    determining, by the terminal or the computing device, an estimated location for the device using a probability distribution model in which a distance between the sample location and the center point is a variable with respect to each of the plurality of sample locations.

8. The method for estimating a location of a device at indoor of claim 7, wherein the determining of the estimated location includes creating, by the terminal or the computing device, a location symmetrical to at least one location among the plurality of first locations based on a wall of the room as the virtual location, when the center point is within a reference distance from the wall of the room.

9. The method for estimating a location of a device at indoor of claim 7, wherein the determining of the estimated location includes creating, by the terminal or the computing device, a virtual third location symmetrical to at least one location among the plurality of first locations based on a first wall constituting a corner of the room when the center point is within a reference distance from the corner of the room, creating a virtual fourth location symmetrical to the at least one location and the third location based on a second wall constituting the corner, and creating the third location and the fourth location as the virtual location.

10. The method for estimating a location of a device at indoor of claim 7, wherein the determining of the estimated location includes computing, by the terminal or the computing device, a normal distribution having a mean value and a standard deviation value for the distance with respect to each of the plurality of sample locations, and determining a point having a highest distribution value from a result of summing the normal distribution for each of the plurality of sample locations as the estimated location, wherein the mean value for any one sample location among the plurality of sample locations is a mean value for the distance at one or more locations in which the intensity of the signal is similar to the intensity of the signal at any one sample location and the standard deviation value is a standard deviation for the distance at the one or more locations.

11. The method for estimating a location of a device at indoor of claim 7, wherein the determining of the estimated location includes computing, by the terminal or the computing device, a normal distribution ($N(\mu_j, \sigma_j)$) having a mean value $\mu_j$ and a standard deviation value $\sigma_j$ for the distance with respect to each of the plurality of sample locations $p_j$, dividing, by the terminal or the computing device, an area in which the plurality of sample locations are located into a plurality of grid cells, assigning a probability for a value obtained by dividing a difference between a distance between the sample location $p_j$ and any one grid cell and the mean value $\mu_j$ by the standard deviation value $\sigma_j$ in the normal distribution for each of the plurality of grid cells, to each of the plurality of sample locations $p_j$ as a weight, and determining, by the terminal or the computing device, a grid cell having a largest sum of the weights among the plurality of grid cells as the estimated location, wherein the mean value $\mu_j$ is a mean value for the distance at one or more locations in which the intensity of the signal is similar to the intensity of the signal at any one sample location $p_j$, and the standard deviation value $\sigma_j$ is a standard deviation for the distance at the one or more locations.

12. A method for estimating a location of a device at indoor comprising:

measuring, by a terminal moving from a starting point in the room, a location of the terminal based on the starting point using a sensor;

receiving, by the terminal, a signal from the device located in the room through short-range communication;

storing, by the terminal, a plurality of first locations in which an intensity of the signal is equal to or greater than a reference value among a plurality of locations where the signal is received from the device or a predetermined number of locations are selected in descending order of the intensity of the signal from the plurality of locations, and the intensity of the signal at the plurality of first locations;

determining, by the terminal or the computing device, a center point of the plurality of first locations; and determining, by the terminal or the computing device, an estimated location for the device using a probability distribution model in which a distance between the first location and the center point is a variable with respect to each of the plurality of first locations.

13. The method for estimating a location of a device at indoor of claim 12, wherein the determining of the estimated location includes computing, by the terminal or the computing device, a normal distribution having a mean value and a standard deviation value for the distance with respect to each of the plurality of first locations, and determining a point having a highest distribution value from a result of summing the normal distribution for each of the plurality of first locations as the estimated location, wherein the mean value for any one first location among the plurality of first locations in which the intensity of the signal is similar to the intensity of the signal at any one first location and the standard deviation value is a standard deviation for the distance at the one or more locations.

14. The method for estimating a location of a device at indoor of claim 12, wherein the determining of the estimated location includes computing, by the terminal or the computing device, a normal distribution ($N(\mu_j, \sigma_j)$) having a mean value $\mu_j$ and a standard deviation value $\sigma_j$ for the distance with respect to each of the plurality of first locations $p_j$, dividing, by the terminal or the computing device, an area in which the plurality of first locations are located into a plurality of grid cells, assigning a probability for a value obtained by dividing a difference between a distance between the first location $p_j$ and any one grid cell and the mean value $\mu_j$ by the standard deviation value $\sigma_j$ in the normal distribution for each of the plurality of grid cells, to each of the plurality of first locations $p_j$ as a weight, and determining, by the terminal or the computing device, a grid cell having a largest sum of the weights among the plurality of grid cells as the estimated location, wherein the mean value $\mu_j$ is a mean value for the distance at one or more locations in which the intensity of the signal is similar to the intensity of the signal at any one first location $p_j$, and the standard deviation value $\sigma_j$ is a standard deviation for the distance at the one or more locations.

15. A method for estimating a location of a device at indoor comprising:

acquiring, by a computing device, a plurality of locations in which a signal is received from the device located in the room and an intensity of the signal at the plurality of locations while measuring, by a terminal moving from a starting point in the room, a location of the terminal based on the starting point;

determining, by the computing device, a center point of a plurality of reference locations in which the intensity of the signal is equal to or greater than a reference value at a corresponding location among the plurality of locations or a predetermined number of locations are selected in descending order of the intensity of the signal from the plurality of first locations; and determining, by the computing device, an estimated location for the device using a probability distribution model in which a distance between the location and the center point is a variable with respect to each of the plurality of locations.

16. The method for estimating a location of a device at indoor of claim 15, wherein the determining of the estimated location includes computing, by the computing device, a normal distribution having a mean value and a standard deviation value for the distance with respect to each of the plurality of locations, and determining a point having a highest distribution value from a result of summing the normal distribution for each of the plurality of locations as the estimated location, wherein the mean value for any one location among the plurality of locations in which the intensity of the signal is similar to the intensity of the signal at any one location and the standard deviation value is a standard deviation for the distance at the one or more locations.

17. The method for estimating a location of a device at indoor of claim 15, wherein the determining of the estimated location includes computing, by the computing device, a normal distribution ($N(\mu_j, \sigma_j)$) having a mean value $\mu_j$ and a standard deviation value $\sigma_j$ for the distance with respect to each of the plurality of locations $p_j$, dividing, by the computing device, an area in which the plurality of locations are located into a plurality of grid cells, assigning a probability for a value obtained by dividing a difference between a distance between the location $p_j$ and any one grid cell and the mean value $\mu_j$ by the standard deviation value $\sigma_j$ in the normal distribution for each of the plurality of grid cells, to each of the plurality of locations $p_j$ as a weight, and determining, by the computing device, a grid cell having a largest sum of the weights among the plurality of grid cells as the estimated location, wherein the mean value $\mu_j$ is a mean value for the distance at one or more locations in which the intensity of the signal is similar to the intensity of the signal at any one first location $p_j$, and the standard deviation value $\sigma_j$ is a standard deviation for the distance at the one or more locations.

* * * * *